United States Patent [19]
Bartalini et al.

[11] 3,821,305
[45] June 28, 1974

[54] PROCESS FOR THE MANUFACTURE OF HEXAMETHYLENEDIAMINE

[75] Inventors: Gastone Bartalini; Mario Giuggioli, both of Novara, Italy

[73] Assignee: Montedison Fibre S.p.A., Milan, Italy

[22] Filed: Oct. 22, 1970

[21] Appl. No.: 83,046

[30] Foreign Application Priority Data
Nov. 7, 1969  Italy .................................. 53940/69

[52] U.S. Cl. .......................................... 260/583 K
[51] Int. Cl. ............................................ C07c 85/12
[58] Field of Search ............................... 260/583 K

[56] References Cited
UNITED STATES PATENTS
| | | | |
|---|---|---|---|
| 2,449,036 | 9/1948 | Grunfeld | 260/583 K |
| 3,418,375 | 12/1968 | Schmitt et al. | 260/583 K |
| 3,461,167 | 8/1969 | Buehler et al. | 260/583 K |
| 3,471,563 | 10/1969 | Brake | 260/583 K |

FOREIGN PATENTS OR APPLICATIONS
| | | | |
|---|---|---|---|
| 1,164,354 | 9/1969 | Great Britain | 260/583 K |

*Primary Examiner*—Joseph P. Brust
*Attorney, Agent, or Firm*—Sughrue, Rothwell, Mion, Zinn & Macpeak

[57] ABSTRACT

A process for the manufacture of hexamethylenediamine by the catalytic hydrogenation of adiponitrile, in liquid phase, at pressures from 20 to 50 atmospheres and temperatures from 60° to 100°C., in the presence of a finely divided Raney catalyst and caustic alkali; wherein hydrogen and adiponitrile are fed into a liquid reaction medium consisting of hexamethylenediamine, water, a caustic alkali and catalyst, in which medium the content of caustic alkali is maintained in the range of 0.2 to 12 moles per kilogram of catalyst, while the content of water is maintained in the range of 2 to 130 moles per 1 mole of caustic alkali.

2 Claims, 1 Drawing Figure

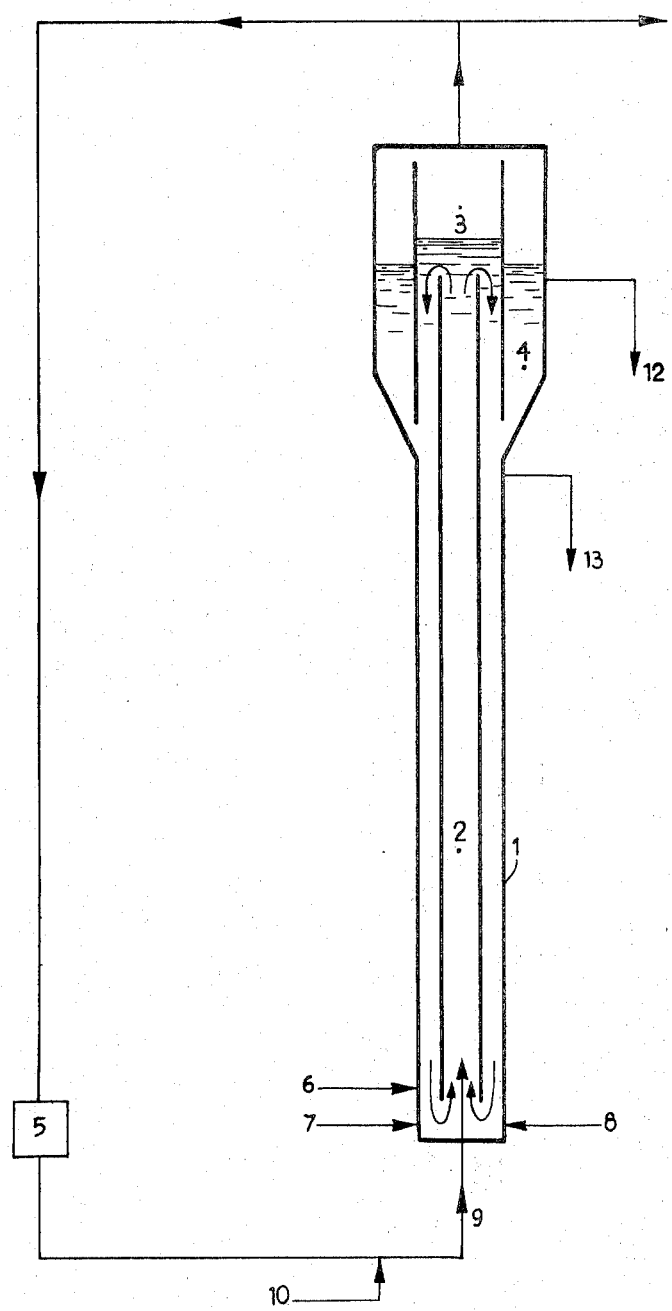

3,821,305

PROCESS FOR THE MANUFACTURE OF HEXAMETHYLENEDIAMINE

The present invention relates to an improved process whereby adiponitrile is hydrogenated catalytically in liquid phase to hexamethylenediamine with the aid of finely divided Raney catalysts.

It is well known that hexamethylenediamine can be obtained by the catalytic hydrogenation of adiponitrile in the presence of Raney catalysts and of other substances such as ammonia (alone or together with such solvents as methanol, ethanol, toluene, etc.) or caustic soda with solvents such as, for example, ethanol or even hexamethylenediamine itself, which is in particular employed as a vehicle for feeding the catalyst to the reaction zone.

It is an object of the present invention to provide a process whereby the use of valuable solvents including hexamethylenediamine can be eliminated, thus avoiding the introduction into the system of substances which, once extracted, need to be re-cycled within that system after suitable treatments.

A further object of this invention is to provide a process whereby it is possible to obtain a high yield of hexamethylenediamine having a low content of impurities, and to reduce the catalyst consumption.

Surprisingly we found that the above objects are attained provided hydrogenation takes place in a reaction medium containing besides the hexamethylenediamine produced by the reaction, also catalyst, water and a caustic alkali in determined proportions; and when these proportions are not adhered to worse results are obtained as regards both the yield and the quality of the hexamethylenediamine.

Such proportions of catalyst, water and caustic alkali in the reaction medium are kept constant by supplying said substances in amounts corresponding to those removed from the reaction vessel.

The process is carried out, according to the invention, at pressures from 20 to 50 atmospheres and temperatures from 60° to 100°C, by feeding molecular hydrogen and adiponitrile into a liquid reaction medium containing besides the hexamethylenediamine produced, also water, a caustic alkali and a finely divided Raney catalyst dispersed in the liquid components of the reaction medium.

The catalyst, which may be Raney nickel, or Raney nickel containing small amounts of other metals such as chromium, for example, loses its activity during the hydrogenation. To maintain a given level of catalytic activity within the catalytic mass, therefore, it is necessary for the catalyst in the reaction medium to be gradually replaced. This replacement is effected by feeding fresh catalyst to the reaction vessel and removing a quantity of reaction medium which contains an amount of catalyst equal to that supplied.

The fed catalyst may also consist of a mixture of fresh catalyst and of catalyst already used in a previous cycle of hydrogenation and merely subjected to suitable washing prior to re-use.

To achieve the aims set out above, the reaction medium should contain:

A quantity of catalyst in excess of 1 part, by weight, per 100 parts of liquid reaction medium (hexamethylenediamine, water and caustic alkali), the upper limit depending solely on the fluidity of the reaction medium; the preferred range is from 3 to 20 parts per 100 parts by weight of the liquid reaction medium;

A quantity of caustic alkali (caustic soda, for example) in the range of 0.2 to 12 moles per kilogram of catalyst and preferably between 1 and 3 moles per kilogram of catalyst;

A quantity of water in the range of 2 to 130 moles per mole of caustic alkali and preferably between 7 and 70 moles per mole of caustic alkali.

As regards the type of caustic alkali to use, it may be mentioned that identical results can be obtained by using hydroxides of all the alkali metals. Throughout the following description, however, reference will be made to caustic soda alone. The liquid part of the reaction medium, in the operating conditions already specified, and within the preferred range of ratio of water to caustic soda, consists of two phases. One phase, amounting to between 0.5 and 5 parts per 100 parts of the other, consists of an aqueous solution of caustic soda whose concentration is in the range of 25 to 55 percent by weight; the other consists of hexamethylenediamine containing water and very little amounts of caustic soda. The aqueous solution of caustic soda, which is the heavier phase, is incorporated for the most part in the catalyst.

The hydrogenation process of this invention may be carried out batchwise, but it is particularly suitable for continuous operation.

The equipment for continuous operation of the process is of conventional type. An example of this, which is not limitative of the invention, is shown in the accompanying drawing. The equipment consists essentially of a vertical tubular reaction vessel, 1, provided inside with an ejection device, 2, such as to promote the agitation of the reaction medium resulting from the hydrogen flow, and at the top with other devices, 3 and 4, which enable the separation of the gas from the liquid and the drawing off from the reaction vessel of a hydrogenated product, having a low content of catalyst thus making it possible to maintain in the reaction vessel relatively high concentrations of catalyst — for example, 10 to 20 parts of catalyst per 100 parts by weight of liquid reaction medium.

The equipment also includes a gas re-cycling pump, 5, and pipes for feeding the reaction vessel with adiponitrile, 6, aqueous suspension of catalyst, 7, aqueous solution of caustic soda, 8, and hydrogen, 9. The hydrogen consumed is replaced by feeding fresh hydrogen through pipe 10.

Part of the gas is vented through pipe 11, the purpose of this release being to maintain the hydrogen content in the re-cycled gas above a given value.

The output of clarified hexamethylenediamine is discharged through pipe 12.

Pipe 13 is used for removing an amount of reaction medium whose catalyst content is equivalent to the amount supplied through pipe 7. In this way, the concentration of catalyst in the reaction medium remains constant.

When operating in the preferred conditions, the process enables hexamethylenediamine to be produced with a low content of impurities, the yield being practically quantitative; however, even when operating outside of the preferred range as regards the ratios of water to caustic soda and of caustic soda to catalyst in the reaction medium, the differences in hexamethylenediamine yield are not remarkable. On the other hand, the results differ substantially when account is taken not only of the yield but also of the quality of the hexamethylenediamine obtained.

When the reaction medium used contains catalyst, caustic soda and water in ratios outside of the claimed limits, the yield of hexamethylenediamine is also considerably lower.

EXAMPLE 1

The reaction vessel already described, containing a mixture consisting of:
hexamethylenediamine;
Raney nickel catalyst containing chromium, 12 parts by weight per 100 parts of liquid reaction medium (hexamethylenediamine, water and caustic soda);

caustic soda, 1.25 moles per kilogram of catalyst (0.6 percent by weight of the liquid reaction medium);

water, 14.9 moles per mole of caustic soda (4 percent by weight of the liquid reaction medium);
stirred by the hydrogen flow, at a temperature of 75°C and pressure of 30 atmospheres, was fed with:
adiponitrile, 30 kg/h;
aqueous suspension of catalyst, 0.87 kg/h (26 parts of catalyst per 100 parts of water);
aqueous solution of caustic soda, 0.66 kg/h (concentration of caustic soda in the solution: approx. 2 percent).

31.9 kg/h of liquid containing 30.6 kg of hexamethylenediamine and small amounts of catalyst, which was separated by filtration were withdrawn from pipe 12.

From pipe 13, reaction medium was withdrawn at the rate of 1.6 kg/h, containing 0.17 kg of catalyst, equivalent approximately to the amount of fed catalyst. The catalyst was separated and washed with water. The hexamethylenediamine recovered by washing was joined to that withdrawn from pipe 12. The washed catalyst was re-used for the preparation of fresh catalyst, to be supplied through feed pipe 7.

The hourly production of hexamethylenediamine was 32 kg; the yield related to the adiponitrile was thus 99.2 percent. These results to a run of 800 hours.

The content of by-products in the hexamethylenediamine was very low. In particular, the sum of ammonia, hexamethyleneimine and $\epsilon$-aminocapronitrile (expressed as ammonia), amounted to approximately 400 p.p.m., while the amount of non-distillable residue and high-boiling substances was 0.3 percent.

By operating as described, the consumption of fresh catalyst was 0.6 parts by weight per 100 parts of hydrogenated adiponitrile.

In another operation, carried out with the same equipment and in the same conditions, using instead of fresh catalyst, a mixture of fresh catalyst and catalyst already used in a previous cycle of hydrogenation and simply washed before re-using, the same results were obtained as regards both the yield and the quality of hexamethylenediamine, while a still lower consumption of fresh catalyst was achieved, namely 0.3 parts per 100 parts of hydrogenated adiponitrile.

Further examples are given below, to show that when hydrogenation is carried out in a reaction medium in which the water-to-caustic soda and caustic soda-to-catalyst ratios are at the limit of the preferred range, the results are worse.

EXAMPLE 2

Hydrogenation was carried out with the same equipment and in the same way as described in Example 1, except for the adoption of a ratio of caustic soda to catalyst (0.73 moles of caustic soda per kilogram of catalyst) which was below the lower limit of the preferred range. The reduction of this ratio was obtained by merely lowering the amount of caustic soda in the reaction medium (0.35 percent related to the liquid reaction medium).

The ratio of water to caustic soda (25.4 moles of water per 1 mole of caustic soda) lays within the preferred range.

The hexamethylenediamine yield was 97.2 percent.

The quality of the hexamethylenediamine was markedly inferior to that obtained in Example 1, especially as regards the content of ammonia, hexamethyleneimine and $\epsilon$-aminocapronitrile. The total amount of these impurities (expressed as ammonia), exceeded 2,000 p.p.m.

EXAMPLE 3

Hydrogenation was carried out with the same equipment and in the same conditions as in Example 1, except for the adoption of a caustic soda-to-catalyst ratio (3.55 moles of caustic soda per kilogram of catalyst) which was above the upper limit of the preferred range. The increase in this ratio was obtained by increasing the amount of caustic soda in the reaction medium (1.7 percent related to the liquid reaction medium). The ratio of water to caustic soda (18.3 moles of water to 1 mole of caustic soda) was kept within the preferred range by raising the concentration of water in the reaction medium (14 percent related to the liquid reaction medium).

The hexamethylenediamine obtained was of inferior quality; in fact, the total content of ammonia, hexamethyleneimine and $\epsilon$-aminocapronitrile (expressed as ammonia) was over 3,000 p.p.m.

EXAMPLE 4

Hydrogenation was carried out with the same equipment and in the same conditions as in Example 1, except for the adoption of a lower water-to-caustic soda ratio in the reaction medium (5.55 moles of water per mole of caustic soda). The reduction in this ratio was obtained by merely lowering the amount of water in the reaction medium (1.5 percent related to the liquid reaction medium). The quality of the hexamethylenediamine resulted noticeably poorer than that obtained in Example 1. In particular, the total content of ammonia, hexamethyleneimine and $\epsilon$-aminocapronitrile (expressed as ammonia) was about 3,000 p.p.m.

EXAMPLE 5

Hydrogenation was carried out with the same equipment and in the same conditions as in Example 1, except for the adoption of a higher water-to-caustic soda ratio in the reaction medium (89 moles of water per 1 mole of caustic soda). The increase in this ratio was obtained by increasing the amount of water in the reaction medium (24 percent related to the liquid reaction medium). The hexamethylenediamine yield was found to be 95.3 percent. The quality of the hexamethylenediamine resulted remarkably poorer than that in Example 1. In particular, the total content of ammonia, hexamethyleneimine and ε-aminocapronitrile (expressed as ammonia) exceeded 4,000 p.p.m.

What we claim is:

1. In a continuous process for producing hexamethylenediamine comprising continuously catalytically hydrogenating adiponitrile in the presence of a hydrogenation catalyst comprising Raney nickel and continuously recovering product hexamethylenediamine, the improvement which comprises:
  1. continuously feeding molecular hydrogen and adiponitrile into a reaction zone containing a liquid reaction medium consisting of, in addition to the hexamethylenediamine produced by said hydrogenation reaction:
     a. from 1 to 20 parts by weight per 100 parts by weight of the total liquid reaction medium of particulate Raney nickel dispersed in the lliquid of the reaction medium;
     b. from 0.2 to 12 moles of an alkali metal hydroxide per kilogram of said Raney nickel; and
     c. from 2 to 130 moles of water per mole of said alkali metal hydroxide;
  2. continuously catalytically hydrogenating said adiponitrile at a temperature of from 60° to 100° C and at a pressure of from 20 to 50 atmospheres to produce hexamethylenediamine in said reaction zone while maintaining the proportions of said Raney nickel, water and alkali metal hydroxide in said liquid reaction medium constant by supplying them into said reaction zone in amounts equal to the amounts of Raney nickel, water and alkali metal hydroxide, respectively, removed from said reaction zone; and
  3. continuously removing and recovering hexamethylenediamine from said reaction zone.

2. In a continuous process for producing hexamethylenediamine comprising continuously catalytically hydrogenating adiponitrile in the presence of a hydrogenation catalyst comprising Raney nickel and continuously recovering product hexamethylenediamine, the improvement comprising:
  1. 1. continuously feeding molecular hydrogen and adiponitrile into a reaction zone containing a liquid reaction medium consisting of, in addition to the hexamethylenediamine produced by said hydrogenation reaction
     a. from 3 to 20 parts by weight per 100 parts by weight of the total liquid reaction medium of particulate Raney nickel dispersed in the liquid reaction medium;
     b. from 1 to 3 moles of an alkali metal hydroxide per kilogram of said Raney nickel; and
     c. from 7 to 70 moles of water per mole of said alkali metal hydroxide; said liquid reaction medium comprising two phases, the first phase comprising hexamethylenediamine containing water and small amounts of said alkali metal hydroxide with the second phase, amounting to 0.5 to 5 parts by weight per 100 parts by weight of the first phase, comprising an aqueous solution of said alkali metal hydroxide having a concentration of from 25 to 55 percent by weight, the aqueous solution of said alkali metal hydroxide, which is the heavier phase, being incorporated predominently in said Raney nickel catalyst;
  2. continuously catalytically hydrogenating said adiponitrile at a temperature of from 60° to 100° C. and at a pressure of from 20 to 50 atmospheres to produce hexamethylenediamine in said reaction zone while maintaining the proportions of the Raney nickel, water and alkali metal hydroxide in said liquid reaction medium constant by supplying them into said reaction zone in amounts equal to the amounts of Raney nickel, water and alkali metal hydroxide, respectively, removed from said reaction zone, the Raney nickel being fed to said reaction zone comprising a mixture of fresh Raney nickel and Raney nickel previously used in said hydrogenation reaction and subjected to a washing step before being reintroduced into said reaction zone; and
  3. continuously removing and recovering hexamethylenediamine from said reaction zone.

* * * * *